Oct. 4, 1949.                M. P. ROBINSON                2,483,672
                           WATER TREATING APPARATUS
                          Original Filed July 13, 1942
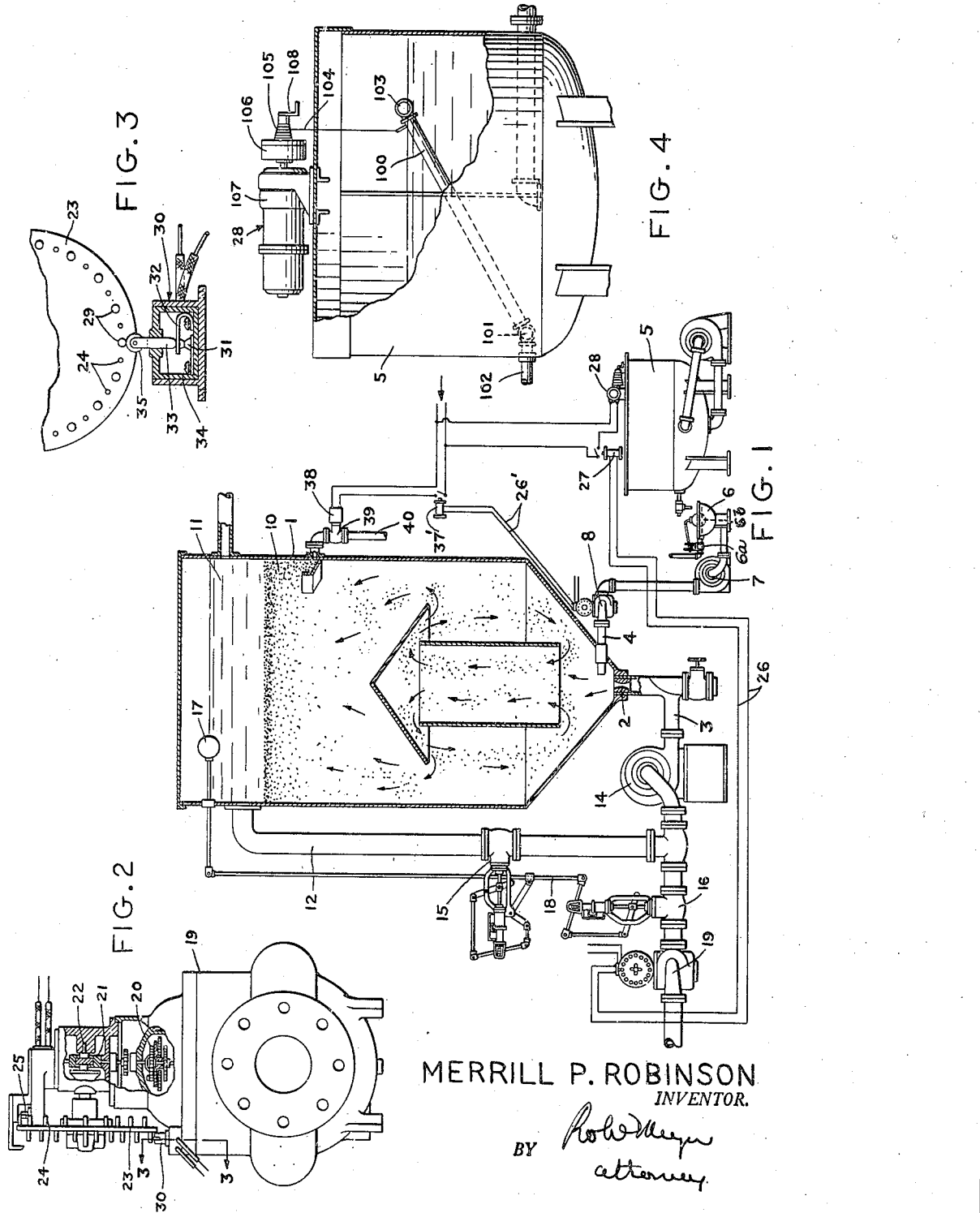
MERRILL P. ROBINSON
*INVENTOR.*
BY Patented Oct. 4, 1949

2,483,672

UNITED STATES PATENT OFFICE 2,483,672

WATER TREATING APPARATUS

Merrill P. Robinson, Upper Montclair, N. J., assignor to Worthington Pump and Machinery Corporation, Harrison, N. J., a corporation of Delaware Original application July 13, 1942, Serial No. 450,732. Divided and this application January 8, 1944, Serial No. 517,500

11 Claims. (Cl. 210—16)

This invention relates to water treating and purifying apparatus, and more particularly to the removal of precipitate or sludge from the treating tank of such apparatus.

The present application is a division of my Patent No. 2,355,561 issued August 8, 1944.

In water treating or purifying systems of the precipitating type wherein the precipitate or precipitated foreign matter accumulates in the precipitating or treating tank and forms a filter bed through which the treated water flows, it is desirable and necessary to the efficient operation of the apparatus to regulate the depth and overall consistency of the filtering bed of precipitate to an approximate constant depth, and since the quantity of foreign matter precipitated within the tank is contingent upon the quantity of water treated, the present invention comprehends the provision of means for controlling the withdrawal of sludge or precipitate from the filter bed in proportion to the quantity of water treated.

The apparatus shown in the present application also comprises the feature of maintaining constant the quantity flow of water through the treating tank, and this operation is provided by the recirculating of a quantity of the treated water from the treated water storage portion of the treating tank back to the inlet for untreated water, and it further comprehends means for controlling the quantity of untreated water delivered to the tank by the quantity of treated water circulated. It will be appreciated that the quantity of reagent chemical fed into the treating tank depends upon the impurity content of the raw water and the quantity of the raw water being delivered to the tank for treatment. The impurity content of the raw water treated in an installation of this type is approximately constant, but the quantity of treated water recirculated depends upon the demand or use of treated water taken from the apparatus, and it is, therefore, a further object of this invention to provide means for controlling the quantity of chemical reagent delivered to the treating or precipitation tank in direct proportion to the quantity of raw untreated water delivered to the treating tank.

With these and other objects in view, as may appear from the accompanying specification, the invention consists of various features of construction and combination of parts, which will be first described in connection with the accompanying drawings, showing a water treating apparatus, of a preferred form embodying the invention, and the features forming the invention will be specifically pointed out in the claims.

In the drawings:

Figure 1 is a view partly in section of a water treating or purifying system of the cold water type, embodying the present invention.

Figure 2 is a detail view partly in section of a water meter employed in the system.

Figure 3 is a fragmentary section through the meter taken on the line 3—3 of Figure 2.

Figure 4 is a fragmentary view partly in section and partly in side elevation of the structure and mechanism supplying the chemical reagent to the pot 6.

Referring more particularly to the drawings, what is commercially known as a cold process water treating apparatus or system is illustrated therein, and in such a system a treating or precipitating tank 1 is employed into which the raw water to be treated is delivered at the bottom of the tank through an inlet nozzle 2 from a raw water supply pipe 3.

The raw water entering the tank 1 is mixed with a chemical reagent of any suitable type which is delivered into the tank 1 near the raw water inlet through an inlet nozzle 4. The chemical reagent is delivered from the mixing apparatus 5 which may be of any approved construction but is preferably of the type shown in Patent No. 2,342,559 issued February 22, 1944, to the intermediate distribution pot 6 from which it is picked up by the pump 7 and forced through the nozzle 4. The pump 7 operates continuously during operation of the apparatus. The chemical reagent is delivered to the distribution pot 6, irregularly. For the purpose of always providing liquid to provide sufficient head for the pump 7 make-up water (from any suitable source not shown) is delivered to the pot 6 and is controlled by the float actuated valve structure 6a which is in turn operated by the float 6b, movement of which is caused by variation of liquid level in the pot 6. A meter 8 is interposed in the connection between the pump 7 and the nozzle 4 for measuring the quantity of chemical reagent delivered to the tank 1.

The mixed water and chemical reagent rises through the tank 1 where the precipitating action sets in and the foreign matter precipitated from the raw water accumulates in a sludge bed 10 intermediate of the top and bottom of the tank 1. The sludge bed 10 forms a filter bed through which the water being treated filters and the sludge in the filtering bed acts as a retaining coagulating agent for collecting foreign matter precipitated from the water during its upward flow through the tank, and thus the water which passes through the filter sludge bed 10 into the treated water storage space 11 of the tank is purified and softened.

To insure the efficient operation of a water treating apparatus of this type it is desirable to maintain constant the quantity flow of water through the treating or precipitating tank 1, however, the demand for treated water from the apparatus usually varies over a wide degree, and if a constant flow of raw water was delivered to the tank 1, an excess quantity of treated water would be provided. To prevent the accumulation of an excess quantity of treated water and to still maintain a constant quantity flow of water through the apparatus, means for recirculating part of the treated water through the tank is provided. This means which forms the subject matter of my Patent No. 2,365,293, issued December 19, 1944, wherein such structure is claimed, comprises the recirculating pipe 12 which has its inlet open to the treated water storage space 11 and its outlet opening into the raw water supply pipe 3 outwardly of the pump 14. A valve structure 15 is interposed in the pipe 12, and a second companion valve structure 16 is interposed in the raw water supply pipe 3 outwardly of the connection of the pipe 12 with the pipe 3. These valves are specifically described in my companion application just referred to, and they are operated by operation of a float 17 which is moved by variances in the level of treated water in the storage space 11 so that the quantity of treated water delivered to the inlet pipe 3 is controlled by variations in the quantity of the treated water in the space 11; and since the valves 15 and 16 are connected by suitable linkage 18 for synchronizing operation, the quantity of raw water delivered through the inlet 2 is controlled inversely to the quantity of treated water recirculated so as to maintain a constant quantity flow of water through the tank 1.

A measure meter 19 is interposed in the raw water supply pipe outwardly of the valve 16, and this meter is shown in detail in Figures 2 and 3 of the drawings. The water meter 19 includes the usual gear train 20 which is operated by the mechanism of the meter, it being understood that the meter mechanism may be of any approved type which may be purchased upon the open market. The gear train 20 in the present invention is, however, connected by suitable gearing 21 to a shaft 22. A disc 23 is mounted on the shaft 22 and it has a plurality of pins 24 carried thereby and extending in one direction from the disc. The pins 24 operate a switch mechanism 25 which latter is connected in an electrical circuit indicated at 26 through a time delay relay 27 with the mechanism 28 which controls the decanting of the chemical reagent from the mixing apparatus into the pot 6, and consequently controls the quantity of chemical reagent delivered to the tank 1 by the quantity flow of raw water through the meter 19. The time delay relay 27 is of the usual approved type which has been on the market for many years and is manufactured by many electrical equipment manufacturers. The time delay relay 27 operates in the manner of all time delay relays providing a short time delay in the energizing of the motor 28 after the electric current is closed by meter structure 19. The specific construction of the switch 25 and the proportioning apparatus are disclosed and claimed in my companion application, Serial No. 416,521, filed October 5, 1941, now abandoned, and since they form no part of the particular invention of the present application will not be specifically described herein. The meter structure 8 which is interposed in the supply line of the chemical reagent to the nozzle 4 is of the same construction as the meter 19, embodying the same type of switch mechanism in its organization so that operation of the meter 8 controls the flow of electrical current through the time delay relay 37', which in turn controls the flow of electrical current into the solenoid 38 which operates the valve mechanism of the solenoid operated valve 39. The mechanism for delivering the chemical reagent to the pot 6, from which it is delivered by the pump 7 into the precipitating tank 1 includes the mixing apparatus 5, previously referred to, in which the chemical reagent is mixed in solution with water. The chemical reagent is dispensed or decanted from the mixer 5 by a decanting tube 100 which is pivotally connected as shown at 101 to the dispensing pipe 102. The upper inlet end of the decanting tube 100 is open, as shown at 103, and this decanting tube is raised and lowered through the medium of the flexible member 104 and the drum 105. The drum 105 is connected by means of a clutch mechanism 106 to the motor 107 of the mechanism 28 so that when the motor 107 is energized the inlet end 103 of the decanting tube 100 will be gradually lowered as the level of the chemical reagent in the mixing tank 5 is lowered so as to deliver the chemical reagent to the pot 6, from which it is pumped by the pump 7 into the tank of the water softening apparatus. When the inlet end 103 of the decanting tube 100 reaches its lowermost position, it is raised by manually winding the flexible member 104 upon the drum through the medium of a handle 108.

The chemical mixing and decanting mechanism just described, is illustrated and described in the mixing device for water treating apparatus patent of J. F. Sebald et al. #2,342,559, and other forms of decanting mechanism for this purpose are shown in United States Patents #2,300,663 issued November 3, 1942 and #2,365,298 issued December 19, 1944.

The set of pins 29 are carried by the disc 23'. The pins 29 operate a switch mechanism 30 which may be carried by the casing of the meter 8 at any suitable position. The switch mechanism 30 includes a stationary contact 31 and a movable contact structure 32. The stationary contact 31 is connected to one end of one line of the electrical circuit 26' while the movable contact 32 is connected to the other end of the same line so that when the contacts 31 and 32 are in engagement the electrical circuit will be closed through the time delay relay 37' for operating the solenoid 38.

A slidable plunger 33 is carried by the casing 34 of the switch 30, and it has a roller 35 on its outer end which engages the pins 29 during the rotation of the disc 23 by the meter mechanism. When one of the pins 29 engages the roller 35 it will move the plunger 33 inwardly and move the movable contact 32 to engage the stationary contact 31 which will close the electrical circuit through the time delay relay 27 and set up operation of the decanting mechanism 28.

The meter structure 8 which is interposed in the supply line of the chemical reagent to the nozzle 4 is of the same construction as the meter 19 embodying the same type of switch mechanism in its organization so that operation of the meter 8 controls the flow of electrical current through the time delay relay 37', which in turn controls the flow of electrical current into the solenoid 38 which operates the valve mechanism of the solenoid operated valve 39. The time delay relay 37' is of the usual type of time delay relay manufactured by numerous electrical equipment manufacturers and which is well known to anyone skilled in electrical connections and currents. The relay 37', acts to provide a short time delay relay between the closing of the electric circuit by the meter structure 8 and the energizing of the solenoid 38. Since time delay relays of this type are various in details of construction since they are well known to all persons having occasion to employ them in various structures they are only shown in diagram in the drawings. The solenoid operated valve 39 is of any approved construction which may be purchased upon the open market, and its valve mechanism is interposed in a pipe 40. The pipe 40 has its inlet opening into a collection box 41 which is placed a predetermined distance below the normal top level of the filtering sludge bed 10 so that when the accumulation of the sludge in the sludge bed 10 reaches a depth that is greater than the desired depth for proper filtering action, the sludge will pass into the sludge collection box 41, and when the valve 39 is opened, sludge will be drawn off from the sludge bed and disposed of in any suitable manner.

From the foregoing description, it will be apparent that the solenoid operated valve structure 39 will be controlled by the quantity flow of chemical reagent into the precipitating or treating tank 1, but operation of the meter 8, and, consequently, the withdrawal of sludge or precipitate from the sludge bed 10 will be controlled in proportion to the quantity of chemical reagent fed to the tank. The quantity of chemical reagent fed to the tank is in turn controlled by the quantity of raw water delivered to the tank through the medium of the meter 19 and its companion mechanism.

It will be understood that the invention is not to be limited to the specific construction or arrangement of parts shown, but that they may be widely modified within the invention defined by the claims.

What is claimed is:

1. In a water treating apparatus of the type wherein precipitated foreign matter accumulates in the form of a filter bed for water being treated, the combination of a precipitation tank having an outlet for treated water and having a precipitation space therein, means for delivering raw untreated water into the precipitation space, means for withdrawing precipitated material from said tank to maintain a predetermined depth of the filter bed formed by the precipitation in the tank, means for delivering chemical reagent to said tank and means controlled by the flow of fluid through said chemical reagent delivering means for controlling the withdrawal of precipitation from the tank.

2. In a water treating apparatus of the type wherein the precipitated foreign matter accumulates in the form of a filter bed for water being treated, the combination of a precipitation tank having an outlet for treated water and having a precipitation space therein, means for delivering raw untreated water into the precipitation space, means for delivering a chemical reagent into the precipitation space of the tank, means for withdrawing precipitated material from said tank to maintain a predetermined depth of the filter bed formed by the precipitation in the tank, means controlled by the flow of fluid through said chemical reagent delivering means for controlling the withdrawal of precipitation from the tank, and means operated by the raw water delivered to said tank for controlling the quantity of chemical reagent delivered to the tank.

3. In a water treating apparatus of the type wherein the precipitated foreign matter accumulates in the form of a filter bed for the water being treated, the combination of a tank including a precipitation space and a treated water space located to receive treated water from said precipitation space, means for feeding water to be treated to said precipitation space, an outlet for treated water from the treated water space, means for delivering a chemical reagent to said precipitation space, means for withdrawing precipitated material from said tank to maintain a predetermined depth of the filter bed formed by the precipitate in the tank, means controlled by the flow of fluid through said chemical reagent delivering means for controlling the withdrawal of precipitation from the tank, means for recirculating part of the treated water through said tank, and means for controlling the quantity of raw untreated water delivered to said precipitation space in inverse proportion to the quantity of treated water recirculated through the tank.

4. In a water treating apparatus of the type wherein the precipitated foreign matter accumulates in the form of a filter bed for the water being treated, the combination of a tank including a precipitation space and a treated water space located to receive treated water from said precipitation space, means for feeding water to be treated to said precipitation space, an outlet for treated water from the treated water space, means for feeding a chemical reagent to said precipitation space, means for withdrawing precipitated material from said tank to maintain a predetermined depth of the filter bed formed by the precipitate in the tank, means controlled by the flow of fluid through said chemical reagent feeding means for controlling the withdrawal of precipitation from the tank, means for recirculating part of the treated water through said tank, means for controlling the quantity of raw untreated water delivered to said precipitation space in inverse proportion to the quantity of treated water recirculated through the tank, and means operated by the raw water delivered to said precipitation space for controlling the quantity of chemical reagent delivered to the precipitation space.

5. In a water treating apparatus, the combination of a precipitating tank having an outlet for treated water and a precipitation space therein, means for delivering raw untreated water into said precipitation space, means for removing precipitated foreign material from said tank, means for delivering chemical reagent into said precipitation space, and means operated by the quantity flow of fluid through said chemical reagent delivering means for controlling operation of said precipitated foreign material removing means.

6. In a water treating apparatus, the combination of a precipitating tank having an outlet for treated water and a precipitation space therein, means for delivering raw untreated water into said precipitation space, means for removing precipitated foreign material from said tank, means for feeding chemical reagent into said precipitation space, a meter for measuring the quantity of chemical reagent fed to said tank, and means operated by said meter for controlling operation of said precipitated foreign material removing means.

7. In a water treating apparatus, the combination of a precipitating tank having an outlet for treated water and a precipitation space therein, means for delivering raw untreated water into said precipitation space, means for removing precipitated foreign material from said tank, means for feeding chemical reagent into said precipitation space, a meter for measuring the quantity of chemical reagent fed to said tank, means operated by said meter for controlling operation of said precipitated foreign material removing means, a meter for measuring the quantity of raw untreated water delivered to said tank, and means controlled by operation of said raw water measuring meter for controlling the quantity of chemical reagent fed to the tank.

8. In a water treating apparatus, the combination of precipitating tank having an outlet for treated water and a precipitation space therein, means for delivering raw untreated water into said precipitation space, means for removing precipitated foreign material from said tank, means for delivering chemical reagent into said precipitation space, means operated by the quantity flow of fluid through said chemical reagent delivering means for controlling operation of said precipitated foreign material removing means, and means operated by the quantity flow of raw untreated water delivered to said precipitation space for controlling the quantity of chemical reagent fed to tank.

9. In a water treating apparatus of the type wherein the precipitated foreign material accumulates in the form of a filter bed for water being treated, the combination of a precipitation tank having an outlet for treated water and having a precipitation space therein, means for delivering raw untreated water into the precipitation space, means for feeding chemical reagent into the precipitation space, means for measuring the quantity of chemical reagent fed to said precipitation space, means controlled by operation of the chemical reagent measuring means by controlling withdrawal of precipitated foreign material from the tank to control the depth of the filter bed, means for measuring the raw water delivered to said precipitation space and means controlled by said raw water measuring means for controlling the quantity of chemical reagent fed to said precipitation space.

10. In a water treating apparatus the combination of a precipitating tank having an outlet for treated water and precipitation space therein, means for delivering untreated water to said precipitation space, means for delivering chemical reagent into said precipitation space, said tank having a storage space for treated water located to receive treated water from said precipitation space, a conduit from said treated water storage space for returning a part of the treated water to said precipitation space, a valve in said conduit for controlling flow of treated water therethrough, a valve for controlling flow of raw untreated water to said precipitation space, means operated by variances in the level of treated water in said treated water storage space, means connecting said level variances operated means to said valves to operate the valves simultaneously but in reverse direction whereby the quantity of untreated water delivered to the precipitation space will be controlled inversely to the quantity of treated water delivered to the precipitation space, means for removing precipitated foreign material from said tank, and means operated by the quantity flow of fluid through said chemical reagent delivering means for controlling operation of said precipitated foreign material removing means.

11. In a water treating apparatus the combination of a precipitating tank having an outlet for treated water and precipitation space therein, means for delivering untreated water to said precipitation space, means for delivering chemical reagent into said precipitation space, sad tank having a storage space located to receive treated water from said precipitation space, a conduit for returning a part of the treated water to said precipitation space, a valve in said conduit for controlling flow of treated water therethrough, a valve for controlling flow of raw untreated water to said precipitation space, means operated in variances in the level of treated water in said treated water storage space, means connecting said level variances operated means to said valves to operate the valves simultaneously in reverse direction whereby the quantity of untreated water delivered to the precipitation space will be controlled inversely to the quantity of treated water delivered to the precipitation space, means for removing precipitated foreign material from said tank, means operated by the flow of fluid through said chemical reagent delivering means for controlling operation of said precipitated foreign material removing means, means for measuring the quantity of raw water delivered to said precipitation space, and means controlled by operation of said measuring means to control the quantity of chemical reagent fed to the precipitation space.

MERRILL P. ROBINSON.

REFERENCES CITED

The following references are of record in the file of this patent:

UNITED STATES PATENTS

| Number | Name | Date |
| --- | --- | --- |
| 976,148 | Caps | Nov. 22, 1910 |
| 1,030,366 | Winters | June 25, 1912 |
| 1,035,813 | Rice | Aug. 13, 1912 |
| 1,971,338 | Constant | Aug. 28, 1934 |
| 2,130,417 | Butzler | Sept. 20, 1938 |
| 2,234,561 | Kettredge | Mar. 11, 1941 |
| 2,240,182 | Guldner et al. | Apr. 29, 1941 |
| 2,245,587 | Hughes | June 17, 1941 |
| 2,314,977 | Green | Mar. 30, 1943 |
| 2,317,847 | Duden | Apr. 27, 1943 |
| 2,355,561 | Robinson | Aug. 8, 1944 |
| 2,365,293 | Robinson | Dec. 19, 1944 |